Sept. 22, 1931.     J. R. WEBB     1,824,644
ICE TONGS
Filed June 15, 1931
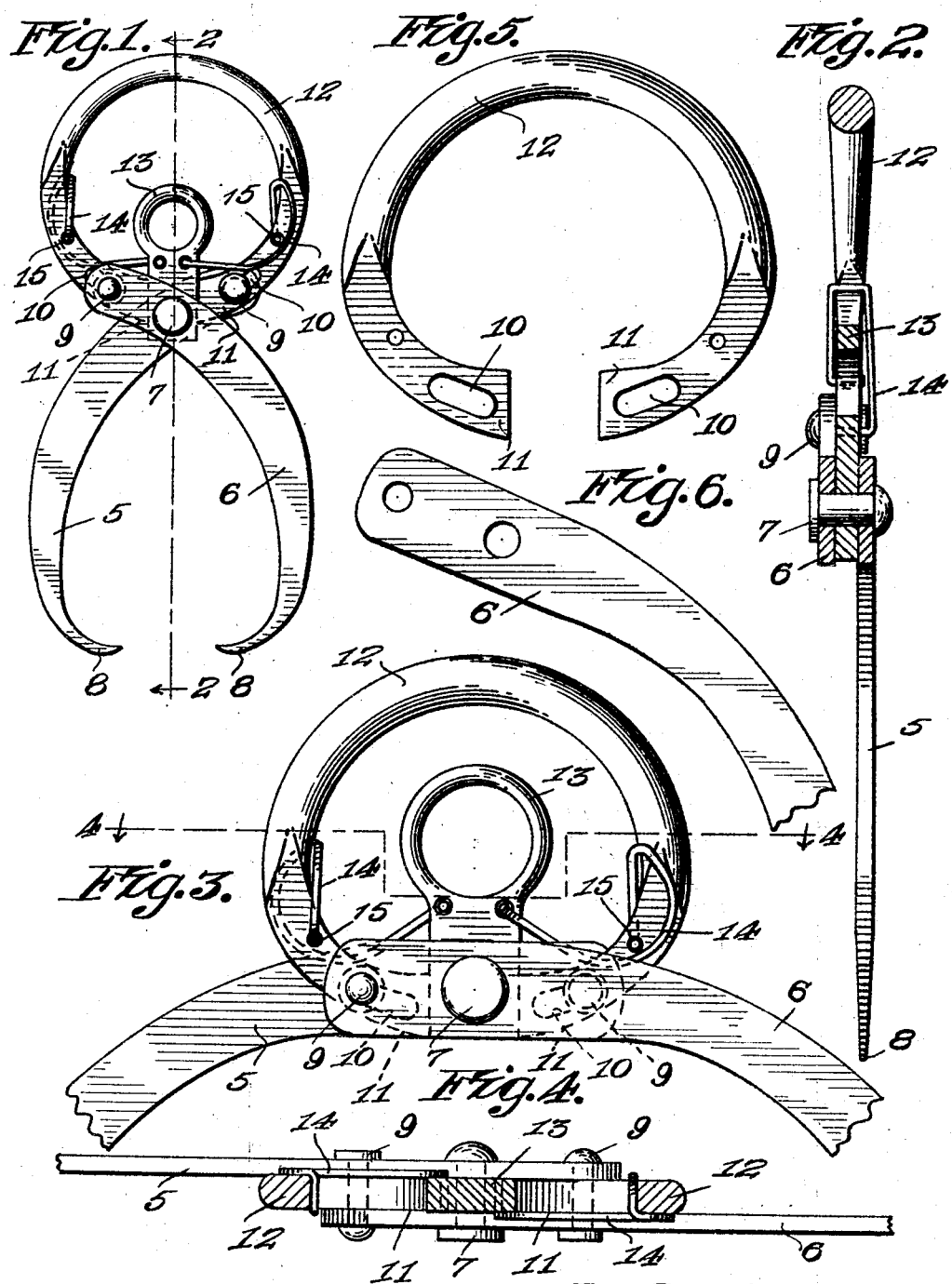
J. R. Webb, INVENTOR
BY Victor J. Evans and Co. ATTORNEY
WITNESS:

Patented Sept. 22, 1931

1,824,644

UNITED STATES PATENT OFFICE

JOHN R. WEBB, OF PARKERSBURG, WEST VIRGINIA

ICE TONGS

Application filed June 15, 1931. Serial No. 544,592.

The invention relates to tongs and more especially to ice tongs.

The primary object of the invention is the provision of tongs of this character, wherein the handle thereof is connected with the jaws or tines of the tongs so that when the implement is not in use the jaws or tines will be maintained closed with relation to each other and on manipulation of the handle on said jaws the tines will open for gripping a piece of ice or other material to be suspended and carried thereby.

Another object of the invention is the provision of a tongs of this character wherein the construction thereof is novel in form so that the same can be readily and conveniently opened and closed at the will of the user but when the tongs are not in use the jaws or tines thereof will be maintained closed.

A further object of the invention is the provision of tongs of this character wherein a positive grip is assured by the jaws or tines thereof and the latter are under the control of the user, the construction of the tongs being such as to permit only hand manipulation thereof.

A still further object of the invention is the provision of tongs of this character, which are extremely simple in construction, thoroughly reliable and efficient in purpose, strong, durable, readily and easily operable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is an elevation of tongs constructed in accordance with the invention, the jaws being in closed position.

Figure 2 is an enlarged sectional view on the line 2—2 of Figure 1 looking in the direction of the arrows.

Figure 3 is a fragmentary elevation showing the tongs open.

Figure 4 is a sectional view on the line 4—4 of Figure 3 looking in the direction of the arrows.

Figure 5 is a detail elevation of the handle of the tongs removed therefrom.

Figure 6 is a fragmentary elevation of one of the jaws or tines of the tongs.

Similar reference characters indicate corresponding parts throughout the several views in the drawings.

Referring to the drawings in detail, the tongs comprises a pair of jaws or tines 5 and 6 respectively, these being arranged in crossed relation to each other and pivoted together by a pivot 7, while the outer ends of said jaws or tines are inwardly curved to form pointed bills or gripping terminals 8.

The inner ends of said jaws or tines beyond the crossing point thereof and their connecting pivot 7 carry lugs 9, these engaging elongated slots 10 formed in the confronting flattened extremities 11 of an open loop-like handle 12 while carried by the pivot 7 to be disposed substantially medially of the handle 12 is a finger engaging eye or ear 13 so that when the finger of the hand of a user is engaged in the eye or ear 13 and such hand is in gripping relation to the handle 12 the jaws or tines 5 and 6 can be manipulated for the opening and closing thereof.

Anchored within the eye or ear 13 and lying on opposite sides thereof are looped tensioning springs 14, these also being anchored at 15 in the handle 12 and said springs 14 serve to exert a tension upon the eye or ear 13 to thrust the same in a direction within the handle 12 to effect the closing movement of the jaws or tines 5 and 6 with respect to each other as is clearly shown in Figure 1 of the drawings. When the hand of an operator grips the handle 12 and has the finger of the hand engaged in the eye or ear 14 and causes a pulling action upon the eye or ear 13 the jaws will be caused to move to open position under the action of the closing grip of the hand on the handle 12 and in this way the tongs can be manipulated for receiving a load and also for the carrying of said load by the terminals 11 of the jaws or tines. The springs 14 will exert a tension between the handle 12 and the eye or ear 13 and thus effect an automatic closing of the jaws or tines 5 and 6 so that a positive and firm grip is assured therebetween as will be clearly obvious.

What is claimed is:—

1. In tongs of the character described, a pair of crossed pivotally connected jaws, a handle having the jaws slidably connected therewith for opening and closing movements, and a tensioned finger engaging element connected with the pivot of the jaws and within the handle whereby gripping action between said handle and member will effect the automatic opening and closing of the jaws.

2. In tongs of the character described, a pair of pivotally connected jaws, a loop handle, means slidably connecting the pivoted jaws with the handle, a finger engaging ear joined with the jaws at the pivotal connecting point thereof, and springs engaged with the ear and handle to automatically effect the closing of the jaws.

In testimony whereof I affix my signature.

JOHN R. WEBB.